UNITED STATES PATENT OFFICE.

IVAN LEVINSTEIN AND CARL MENSCHING, OF MANCHESTER, ENGLAND, ASSIGNORS TO THE LEVINSTEIN, LIMITED, OF SAME PLACE.

BROWN TETRAZO DYE AND PROCESS OF MAKING SAME.

SPECIFICATION forming part of Letters Patent No. 622,961, dated April 11, 1899.

Application filed June 14, 1897. Serial No. 640,775. (Specimens.)

*To all whom it may concern:*

Be it known that we, IVAN LEVINSTEIN, a subject of the Queen of Great Britain and Ireland, and CARL MENSCHING, a subject of the German Emperor, both residing at Manchester, in the county of Lancaster, England, have invented certain new and useful Improvements in the Manufacture of New Azo Coloring-Matters, of which the following is a specification.

This invention has been patented in Great Britain, dated December 9, 1895, No. 23,523, and in France, dated October 5, 1896, No. 260,210.

A great disadvantage which prevents the more extensive use of some of the direct-dyeing red and brown azo colors is that they are not fast to daylight.

The object of our present invention is the production of such colors which will surpass in fastness to light most of the azo colors hitherto known. For this purpose we have found that the mixed tetrazo colors resulting from the combination of one molecule of the tetrazo compounds of paradiamins with one molecule of salicylic acid or homologues thereof and one molecule of anilin or homologues thereof, when further diazotized and combined with amins, phenols, amidophenols, dioxy compounds, both of the benzene and naphthalene series, as well as their known carboxyl and sulfonic acids, produce colors giving the desired result.

The following examples are given as illustrating the methods which we may employ in carrying out our invention.

*Example* I.—18.4 kilos of benzidin are converted in the usual manner into tetrazodiphenyl chlorid, which is then combined with 14.0 kilos of salicylic acid. The formation of the intermediate product begins at once, and the reaction is completed in a comparatively short time. The intermediate product is allowed to run into a solution in water of twenty-six kilos of anilin hydrochlorid. The resulting mixture is stirred for about twelve hours and is afterward heated to about from 40° to 50° centigrade and is kept at this temperature for about six hours. The mixture is then made alkaline, and the anilin which has not entered into combination is removed in the usual well-known manner. As soon as the superfluous anilin has been removed the mixture, which contains a yellow coloring-matter having the following formula,

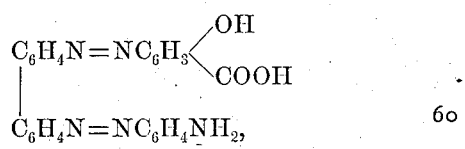

is acidulated by means of hydrochloric or other suitable acid and is then diazotized with 7.2 kilos of sodium nitrite and stirred for a few hours. After subsequently standing for about twelve hours the formed brown diazo compound is poured into an alkaline solution containing twenty-four kilos of amidonaphthol sulfonic acid gamma while stirring. The formation of the dyestuff is completed after a short time, whereupon it is salted out, filtered, pressed, and dried. It forms a brownish-black powder and dyes unmordanted cotton a deep brown.

*Example* II. 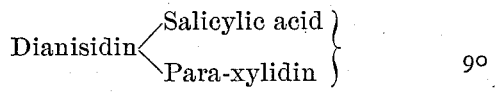 *further diazotized and combined with one molecule of phenylamidonaphthol sulfonic acid gamma.*—24.0 kilos of dianisidin are converted in the usual manner into the tetrazo compound, which is then combined with 14.0 kilos of salicylic acid. After the intermediate product is formed it is allowed to run into a solution of 31.5 kilos of para-xylidin hydrochlorid. The further treatment is carried out as in Example I. The resulting orange color $$\text{Dianisidin} \Big\langle \begin{array}{l} \text{Salicylic acid} \\ \text{Para-xylidin} \end{array} \Big\}$$

is then well mixed with about twenty parts of water to a thin paste, cooled by means of ice, and acidulated with seventy kilos of hydrochloric acid 18° Baumé. This mixture is then diazotized with a solution of 7.2 kilos of sodium nitrite. After being stirred for about twelve hours the reaction is completed. The insoluble brown diazo compound thus formed is allowed to run into an alkaline solution of 31.5 kilos of phenylamidonaphthol sulfonic acid gamma. The formation of the dyestuff is completed after a short time. It is then salted out, filtered, pressed, and dried. It dyes unmordanted cotton a deep black-brown.

Red dyestuffs result if, instead of amidonaphthol sulfonic acid gamma, naphthol sulfonic acids—such, for example, as naphthol sulfonic acid N. W.—are substituted in the examples above given, and yellow dyestuffs result if salicylic acid be substitutively employed.

A series of very valuable dyestuffs, from red to deep brown, result if instead of benzidin other paradiamins are employed—as, for example, tolidin, dianisidin, ethoxybenzidin, diamidostilbene disulfonic acid—and if instead of anilin its homologues, such as orthotoluidin or paraxylidin, are used.

The coloring-matters produced according to this invention are suitable not only for cotton, but also for wool, silk, jute, and other textile fibers.

Having now particularly described and ascertained the nature of our said invention and in what manner the same is to be performed, we declare that what we claim is—

1. The process for the production of new direct cotton-dyes which consists in acting by one molecular proportion of a tetrazo compound of a paradiamin on one molecular proportion of an ortho-oxycarbonic acid of the benzene series; combining the intermediate product with one molecular proportion of a rediazotizable primary aromatic monamin of the benzene series, to form a mixed tetrazo coloring-matter; rediazotizing this mixed tetrazo coloring-matter; and combining the resulting diazo compound with known dyestuff components, substantially as described.

2. The process for the production of brown tetrazo coloring-matters which consists in combining in unimolecular proportions tetrazodiphenyl obtained by the tetrazotization of benzidin with salicylic acid, to form an intermediate product, which product is combined with one molecular proportion of anilin, forming a yellow mixed tetrazo coloring-matter, rediazotizing the thus-obtained coloring-matter, and combining the product with one molecular proportion of a naphthol sulfonic acid gamma, substantially as set forth.

3. As a new article of manufacture, the new red-brown direct cotton-dyestuff produced by combining tetrazodiphenyl with salicylic acid and anilin, rediazotizing the intermediate product and combining it with a naphthol sulfonic acid gamma, which product is a dark-brown powder easily soluble in water with a brown-red color, barely soluble with the same color in alcohol, soluble with a bluish-violet color in concentrated sulfuric acid, and which forms a brownish-red precipitate on the addition of hydrochloric acid to its aqueous solution, and dyes red-brown shades in an alkaline or salt bath on unmordanted cotton, fast to light, substantially as described.

4. As a new article of manufacture, the new dark-brown direct cotton-dyestuff, produced by combining tetrazodiphenyl with salicylic acid and anilin, rediazotizing the intermediate product and combining it with phenylamidonaphthol sulfonic acid gamma, which product is a dark black-brown powder easily soluble in water with a dark-brown color, barely soluble in alcohol with a reddish-brown color, soluble in concentrated sulfuric acid with a bluish-violet color, and which forms a dark precipitate when concentrated hydrochloric acid is added to its aqueous solution, and which, further, dyes on cotton dark olive-brown shades fast to light, substantially as described.

IVAN LEVINSTEIN.
CARL MENSCHING.

In presence of—
WILLIAM E. HEYS,
ARTHUR MILLWARD.